United States Patent [19]

Metrailer

[11] 4,426,277
[45] Jan. 17, 1984

[54] LOW SEVERITY FLUID COKING PROCESS

[75] Inventor: William J. Metrailer, Baton Rouge, La.

[73] Assignee: Exxon Research and Engineering Co., Florham Park, N.J.

[21] Appl. No.: 378,211

[22] Filed: May 14, 1982

[51] Int. Cl.³ .............................................. C10G 9/32
[52] U.S. Cl. .................................... 208/127; 208/156
[58] Field of Search ............... 208/127, 153, 156, 157

[56] References Cited

U.S. PATENT DOCUMENTS

| 2,606,097 | 8/1952 | Goodson et al. | 208/153 |
| 2,780,586 | 2/1957 | Mader | 208/127 |
| 2,880,160 | 3/1959 | Arey, Jr. et al. | 208/156 X |
| 2,881,130 | 4/1959 | Pfeiffer et al. | 208/127 |
| 2,885,272 | 5/1959 | Kimberlin, Jr. et al. | 208/127 |
| 2,885,344 | 5/1959 | Garbo | 208/156 X |
| 2,894,899 | 7/1959 | Crawley | 208/127 |
| 2,906,695 | 9/1959 | Boston | 208/127 |
| 3,260,664 | 7/1966 | Metrailer et al. | 208/127 |
| 3,374,168 | 3/1968 | Metrailer | 208/127 |
| 3,409,542 | 11/1908 | Molstedt | 208/127 |
| 3,671,424 | 6/1972 | Saxton | 208/127 |
| 3,816,084 | 6/1974 | Moser et al. | 48/206 |
| 4,055,484 | 10/1977 | Blaser et al. | 208/127 |

Primary Examiner—Delbert E. Gantz
Assistant Examiner—Glenn A. Caldarola
Attorney, Agent, or Firm—Marthe L. Gibbons

[57] ABSTRACT

A fluid coking process is provided in which a carbonaceous feed is first coked in a dense fluidized bed first coking zone and the effluent of the dense bed is passed as a suspension through a transferline second coking zone. A major portion of the solids is separated from the effluent of the upper end of the transferline and passed to a third coking zone which is operated at a higher temperature than the other coking zones and in which the first and second coking zones are positioned.

7 Claims, 1 Drawing Figure

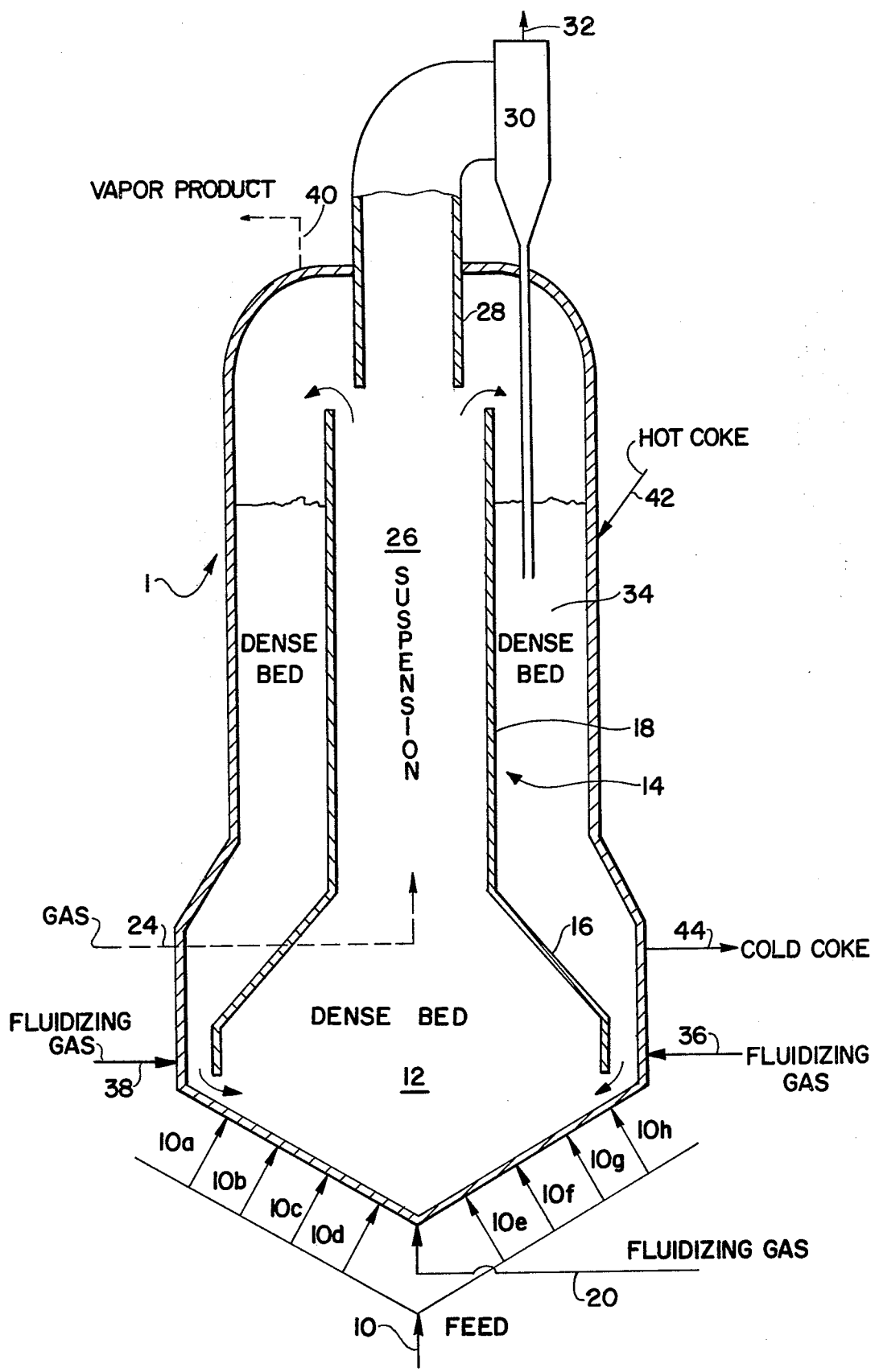

LOW SEVERITY FLUID COKING PROCESS

BACKGROUND OF THE INVENTION

1. Field of the Invention

This invention relates to an improvement in a fluid coking process.

2. Description of the Prior Art

Fluid coking is a well known process which may be carried out with or without recycle of a heavier portion of the fluid coking zone effluent. As is well known in the art, the fluid coking process, as shown, for example, in U.S. Pat. No. 2,881,130, which is hereby incorporated by reference, uses a fluid coking vessel and an external heating vessel. A fluid bed of solids, preferably coke particles produced by the process, having a size in the range from about 40 to about 1000 microns, is maintained in the coking zone by the upward passage of fluidizing gas, usually steam, injected at a superficial velocity typically between 0.3 and 5 feet per second. The temperature in the fluid coking bed is maintained in the range of about 850 to about 1400° F., preferably between 900° and 1200° F. by circulating solids (coke) to the heating vessel and back. The heavy oil to be converted is injected into the fluid bed and upon contact with the hot solids undergoes pyrolysis evolving lighter hydrocarbon products in vapor phase, including normally liquid hydrocarbons, and depositing a carbonaceous residue (coke) on the solids. The turbulence of the fluid bed normally results in substantially isothermal reaction conditions and thorough and rapid distribution of the heavy injected oils. The feed rate and temperature are controlled to maintain the bed in a fluidized state. Product vapors, after removal of entrained solids, are withdrawn overhead from the coking zone and sent to a scrubber and fractionator for cooling and separation. The end boiling point of distillate fractions obtained from the process is usually about 1050° F. to about 1200° F. and the remaining heavy ends are usually recycled to extinction.

The conventional fluid coking process is generally carried out to maximize the yields of lower boiling normally liquid hydrocarbon products, particularly components boiling in the gas oil range, e.g. 430° to 1050° F. The fluid coking process may also be used as a feed pretreatment to effect partial demetallization and to lower the Conradson carbon content of the feed without maximizing conversion to liquid products. Thus, a low severity fluid coking process would be desirable for pretreatment of carbonaceous feeds prior, for example, to hydroconversion, hydrodesulfurization, catalytic cracking and other processes which operate more effectively on low metals feed or low Conradson carbon feed.

An improved low severity fluid coking process has now been found in which the feed is first treated in a dense fluidized bed and the effluent of the dense fluidized bed is treated in a transferline zone.

SUMMARY OF THE INVENTION

In accordance with the invention there is provided, a fluid coking process which comprises: (a) reacting a carbonaceous chargestock in a first coking zone containing a bed of fluidized solids maintained at fluid coking conditions to form coke, said coke depositing on said fluidized solids, and a vapor phase product; (b) passing said vapor phase product and entrained solids into a second coking zone, said second coking zone being an elongated zone having a smaller internal diameter than said first coking zone to form a suspension of said entrained solids in said vapor phase product and to increase the velocity of said suspension; (c) reacting said suspension in said second coking zone for a residence time of about 0.5 to about 7 seconds; (d) separating a major portion of said solids from said suspension; (e) passing the resulting separated solids comprising adherent hydrocarbons to a third fluidized bed coking zone maintained at a temperature higher than the operating temperature of said first dense bed coking zone; and (f) cracking at least a portion of said adherent hydrocarbons in said third coking zone.

BRIEF DESCRIPTION OF THE DRAWING

The FIGURE is a schematic flow plan of one embodiment of the invention.

DESCRIPTION OF THE PREFERRED EMBODIMENTS

Referring to the figure, a carbonaceous feed carried in line 10 along with an atomizing gas such as high pressure steam (see U.S. Pat. No. 2,891,000) is introduced via lines 10a through 10h at multiple points into the bottom of first coking zone 12 in which is maintained a dense fluidized bed of particles, (e.g. coke particles of 40 to 1000 microns) located in a lower enlarged portion 16 of a draft tube 14 located in a vessel 1, e.g. coker, which is tapered at its bottom end in conical shape. The enlarged lower portion 16 of draft tube 14 is open at its lower end and in spaced relation to the bottom of vessel 1. The upper portion of draft tube 14 is a narrow elongated section 18 which can function as a transferline. Suitable carbonaceous feeds for first coking zone 12 include heavy hydrocarbonaceous oils; heavy and reduced petroleum crude; petroleum atmospheric distillation bottoms; petroleum vacuum distillation bottoms; pitch; asphalt; bitumen; other hydrocarbon residues; tarsand oil; shale oil; coal; coal slurry; liquid products derived from coal liquefaction processes, including coal liquefaction bottoms, and mixtures thereof. Typically such feeds have a Conradson carbon residue of at least 5 weight percent, generally from about 5 to about 50 weight percent, preferably above about 7 weight percent (as to Conradson carbon residue, see ASTM Test D-189-65). A fluidizing gas is admitted by line 20 into first coking zone 12 in an amount at least sufficient to maintain the solids as a dense fluidized bed in first coking zone 12, for example, a superficial gas velocity of at least 0.3 to 5 feet per second. The fluidizing gas may comprise steam, normally gaseous hydrocarbons, vaporized normally liquid hydrocarbons, hydrogen, hydrogen sulfide and mixtures thereof. Typically, the fluidizing gas will comprise steam. The first coking zone 12 is maintained at a temperature ranging from about 850° F. to about 1400° F., preferably from about 900° to about 1200° F. by circulation of hot solids as will be described later, and at a pressure ranging from about 0 to about 150 psig, preferably from about 5 to about 45 psig. Contact of the carbonaceous feed with the hot fluidized solids produces a solid carbonaceous residue (coke) which deposits on the solids and a vapor phase product which includes normally liquid hydrocarbons. The vapor phase product of the first coking zone and entrained solids form a suspension above dense bed 12. In accordance with the present invention, draft tube 14 comprises an elongated upper portion 18 which has a smaller internal diameter than the internal diameter of a lower portion 16 of the draft tube so that the velocity of the vapor phase product passing through section 18 is increased as it passes into the elongated confined column, for example, to above 10 feet per second, thereby lifting a portion of (or entraining) solids out of the dense bed into the elongated portion 18 of draft tube 14 to form a suspension therein having a density ranging from about 0.7 pounds per cubic foot to about 7.0 pounds per cubic foot. The narrow upper portion 18 thus functions as a transferline second coking zone. If desired, additional gas, such as steam, may be introduced by line 24 into upper portion 18 of the draft tube. The suspension of solids in vapor phase reaction products flows through the elongated upper portion 18, which is a transferline second coking zone 26, at a superficial gas velocity in the range of 10 to 50 feet per second. The upper portion 18 is designed to give 0.5 to 7 seconds, preferably about 1 to 5 seconds vapor residence time in second coking zone 26. The pressure in second coking zone 26 may range from 0 to 150. The temperature in second coking zone 26 is maintained in the range of 850° to 1400° F., preferably 900° to 1200° F. At the top of portion 18, the suspension flows out of the open end whereby a major portion of solids is separated from vapor phase products by gravity or other known means such as by positioning vanes in upper portion 18 to induce a centrifugal force to assist in separation of the solids. The vapor phase products, which still comprise a small amount of solids, pass through a conduit 28 disposed in the upper portion of vessel 1 and having a lower extremity disposed centrally in section 18. The conduit, which may have a smaller diameter than the cross section of upper portion 18, terminates in a gas-solids separation zone, such as cyclone 30, wherein the small amount of solids is separated from the vapor phase products. The vapor phase products are recovered by line 32 for cooling and fractionation in a conventional way. The solids are returned via cyclone dipleg into a dense fluidized bed 34 of solids maintained in vessel 1. The dense bed 34 is fluidized by the introduction of a fluidizing gas such as steam by lines 36 and 38. Dense bed 34, which surrounds draft tube 14, may be considered to be a third coking zone (i.e., cracking zone). Dense bed 34 is maintained at a higher temperature, for example, at least 25 Fahrenheit degrees, preferably 50 to 100 Fahrenheit degrees, higher than the actual temperature of dense bed 12. The pressure ranges in the third coking zone are substantially the same pressure ranges as those of the first and second coking zones. In dense bed 34, residual hydrocarbons, which may have adhered to the solids which pass into it are cracked to lower boiling products. If desired, vapor products may be removed separately by line 40 from an outlet in vessel 1. Third coking zone 34 is maintained at an elevated temperature by the introduction of hot solids (e.g. coke) by line 42. The hot solids may be derived from a heating zone which may be a coke burner, such as shown in U.S. Pat. No. 2,881,130, the teachings of which are hereby incorporated by reference, or a heat exchange zone or a gasification zone such as shown in U.S. Pat. Nos. 3,816,084 and 4,055,484, the teachings of which are hereby incorporated by reference. When the conical bottom of vessel 1 is greater than the angle of repose of the solids, the solid particles will flow to the base of the cone and thereafter, the solids will flow into dense fluidized bed 12. A stream of relatively colder solids is removed from bed 34 by line 44. The stream of colder solids may be circulated to a coke burner or a heat exchange zone for reheating, as is known in the art, and recirculated as hot solids to bed 34.

What is claimed is:

1. A fluid coking process which comprises:
   (a) introducing a carbonaceous chargestock into a first fluidized bed coking zone containing a bed of fluidized solids maintained at fluid coking conditions, including a temperature ranging from about 850° to about 1400° F. and a pressure ranging from about 0 to about 150 psig, to form coke, said coke depositing on said fluidized solids, and a vapor phase product;
   (b) passing said vapor phase product and entrained solids into a second coking zone maintained at a temperature ranging from about 850° to about 1400° F. and a pressure ranging from about 0 to about 150 psig, said second coking zone being an elongated zone having a smaller internal diameter than said first coking zone, to form a suspension of said entrained solids in said vapor phase product and to increase the velocity of said suspension;
   (c) reacting said suspension in said second coking zone for a residence time ranging from about 0.5 to about 7 seconds;
   (d) separating a major portion of said solids from said suspension;
   (e) passing the resulting separated solids comprising adherent hydrocarbons to a third fluidized bed coking zone maintained at a pressure ranging from about 0 to about 150 psig and a temperature at least about 25 Fahrenheit degrees higher than the operating temperature of said first fluidized bed coking zone, and
   (f) cracking at least a portion of said adherent hydrocarbons in said third coking zone.

2. The process of claim 1 wherein said suspension is reacted in said second coking zone for a residence time ranging from about 1 to about 5 seconds.

3. The process of claim 1 wherein said first and second coking zones are maintained at a temperature ranging from about 900° to about 1200° F.

4. The process of claim 1 wherein the superficial gas velocity in said first coking zone ranges from about 0.3 to about 5 feet second; and the superficial space velocity in said second coking zone ranges from about 10 to about 50 feet per second.

5. The process of claim 1 wherein the vapor phase product of said second coking zone is recovered separately from the vapor phase product of said third coking zone.

6. The process of claim 1 wherein the vapor phase product of said second coking zone and entrained solids are passed to a gas-solids separation zone and the resulting separated solids are recycled to said third coking zone.

7. The process of claim 1 wherein a stream of hot solids is introduced into said third coking zone and wherein a stream of colder solids is removed from said third coking zone.

* * * * *